Nov. 18, 1941.    F. J. KEILING ET AL    2,263,542
ANTISKID TRACTION BELT
Filed Feb. 21, 1940

INVENTOR
Fred J. Keiling and
Adrian M. Turner
BY,
H. Lee Helms
ATTORNEY.

Patented Nov. 18, 1941

2,263,542

UNITED STATES PATENT OFFICE 2,263,542

ANTISKID TRACTION BELT

Fred J. Keiling, Jamaica, and Adrian M. Gainer, Richmond Hill, N. Y., assignors of one-third to Florence Ahrends, Brooklyn, N. Y.

Application February 21, 1940, Serial No. 320,008

1 Claim. (Cl. 152—220)

The object of the present invention is to provide a non-skid belt adapted for use with the plural-tire wheels customarily used on heavy-duty trucks, and, in some cases, on light trucks. The characteristic of the device is that a plurality of non-skid contact elements are carried by and projected laterally from a belt disposed between the two tires of a plural-tire wheel or wheels, the belt comprising a plurality of mutually pivoted metallic belt elements, the arrangement being such that the belt may be located substantially below the tire peripheries for centering and guide positioning either directly by the tire walls or indirectly by the contact with the tires of bent and depending areas of the non-skid contact elements. In the embodiment illustrated, the non-skid contact elements each have a central depending U-shaped area for contact at opposite faces with the opposed rim areas of two wheels, and also oppositely directed plates which lie over the two tires carried by said wheels, the belt being connected to the said U-shaped depending area.

The invention will be described with reference to the accompanying drawing, in which.

Figure 1:
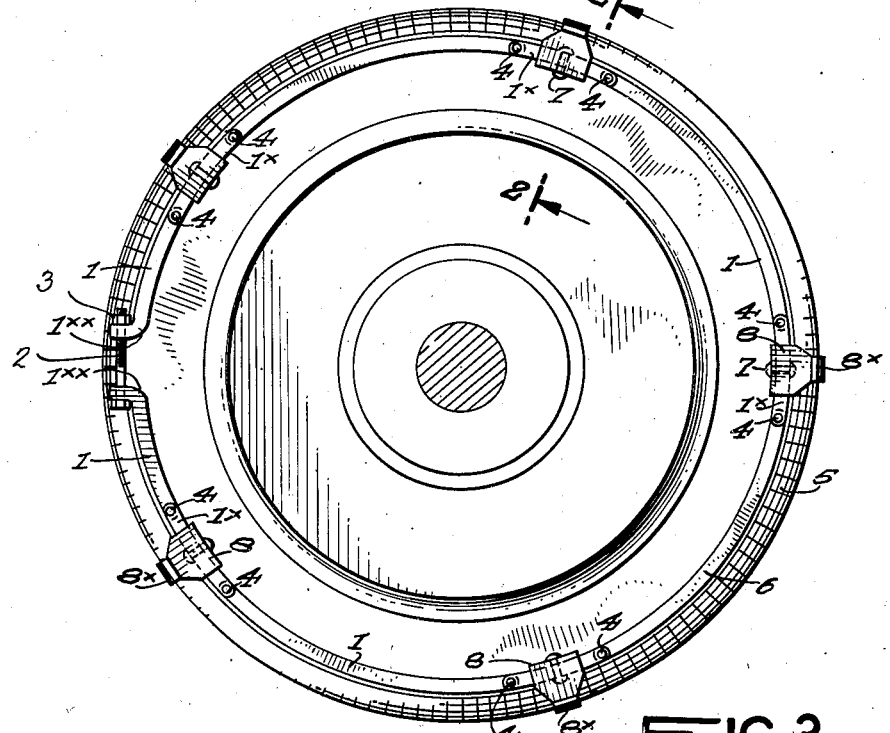
Figure 1 is a view in elevation illustrating an embodiment of the invention.

Referring to the drawing, we have shown at 1 a plurality of arcuate metallic belt elements which are pivotally connected to a plurality of arcuate metallic belt elements 1x of shorter length. Two of the belt elements 1 are bent outwardly with flanges 1xx which are apertured to receive a connecting member such as bolt 2 having thereon a nut 3 by means of which the said belt elements may be adjusted toward and from each other.

The belt elements 1, 1x, are pivotally connected by the pivot studs 4. For such purpose each of the belt elements 1x may be formed with ears, as shown in Figure 3, to receive the reduced and apertured ends of the belt members 1.

Figure 2:
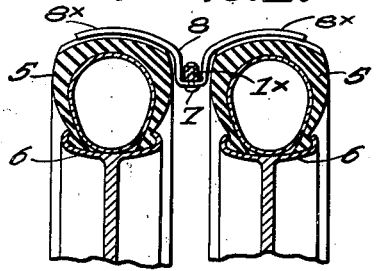
Figure 2 is a view in section taken on the line 2—2, Figure 1.

The diameter of the belt comprising the members described above will be substantially less than the diameter of the tires indicated at 5, Figure 2, as carried by the usual wheel rim 6. To each belt member 1x is secured, as by a rivet 7, a non-skid contact member the form of which appears by reference to Figures 2 and 3.

Each non-skid contact member comprises a strap or plate of metal bent intermediate its length into U-shaped formation to provide a depending area 8 and a curved non-skid contact face 8x for each tire 5. Each contact face may be suitably formed to provide a non-skid surface.

Figure 3:
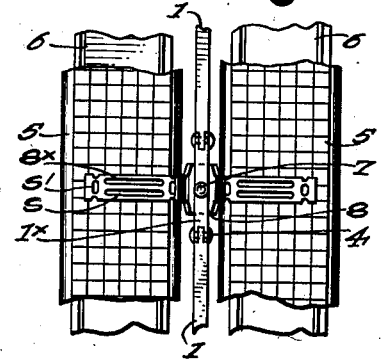
Figure 3 is a plan view, showing fragmentarily, the rims of two wheels, tires carried by the rims, and a belt section and non-skid contact element carried thereby.
Figure 4:
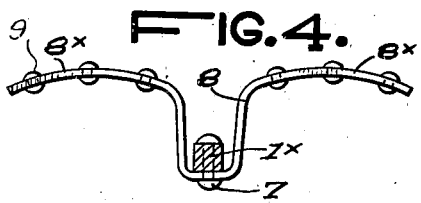
Figure 4 is an end elevation showing a modified form of non-skid contact element.
Figure 5:
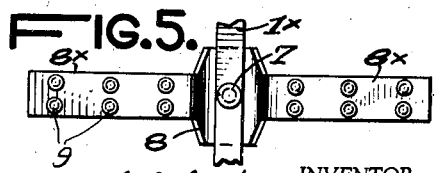
Figure 5 is a plan view of the structure in Figure 4.

In the structure illustrated in Figure 3, the surface is provided by means of longitudinally directed slots s, transversely directed slots s' and, wherever desired, insert plugs of rubber or other material, these inserts not being shown in the drawing. As an alternative arrangement, the members 8x may be apertured to receive contact rivets 9, as shown in Figures 4 and 5.

If desired, each one of the belt sections may carry one or more non-skid tire contact members. These members may be replaced when worn by a simple riveting removing and rivet operation; and, if desired, the rivet 7 may be substituted by headed studs receiving wing nuts or any other suitable means for connecting the non-skid elements with the belt.

In the operation of the device, the belt and its contact members has no connection with the wheel itself and the device may be so applied that the contact elements will be pressed firmly down upon the tire surfaces or may be only lightly contacted so that they may shift relatively to the surfaces of the tires, which is considered desirable in such devices. A feature of the device is that it is inexpensive to construct and very quickly and easily applied and removed.

Having described our invention, what we claim and desire to secure by Letters Patent, is as follows:

A non-skid traction belt comprising a plurality of non-skid contact members each having a U-shaped central area and opposed integral contact arms of curvilinear formation projected at the sides of the central area, said central area being perforated both at its top and at its ends, a relatively short belt section placed adjacent the U-shaped central area of each non-skid contact member, a pivot pin connecting each non-skid contact member to its appropriate relatively short belt section and permitting swinging movement of said contact member, in each case, and curvilinear belt sections connecting the relatively short belt section.

FRED J. KEILING.
ADRIAN M. GAINER.